3,353,914
METHOD OF SEED-PULLING BETA SILICON CARBIDE CRYSTALS FROM A MELT CONTAINING SILVER AND THE PRODUCT THEREOF
Paul B. Pickar, Jr., Winter Park, Fla., assignor to Martin-Marietta Corporation, Baltimore, Md., a corporation of Maryland
Filed Dec. 30, 1964, Ser. No. 422,316
6 Claims. (Cl. 23—208)

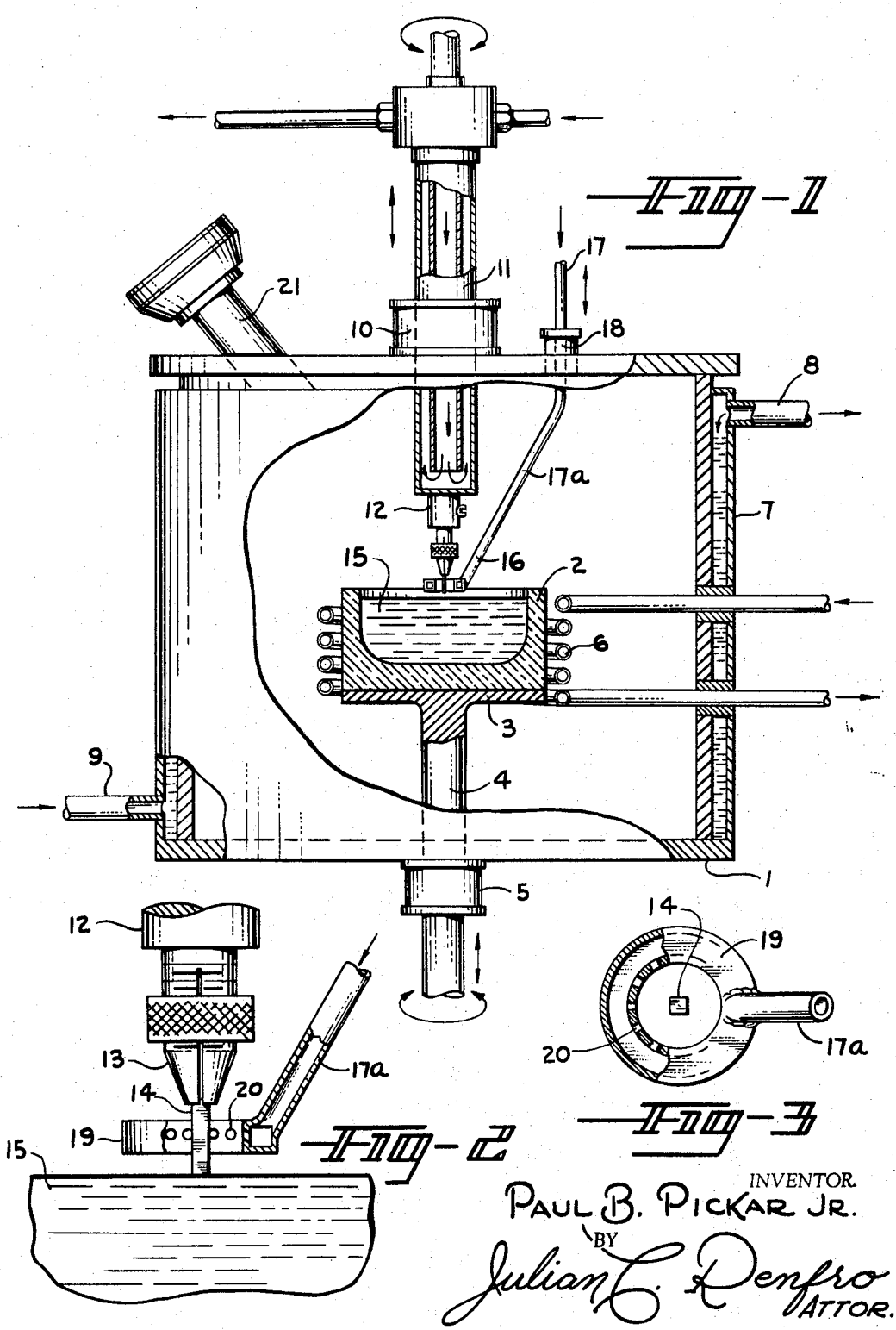

ABSTRACT OF THE DISCLOSURE

The invention is the method of seed-pulling beta silicon carbide crystals from a melt containing silver, carbon and silicon and the product thereof.

---

This invention relates to a method of growing highly pure beta silicon carbide crystals, and more particularly to the growing of single crystals of such purity from a melt containing carbon, silicon, and a suitable metal readily miscible with silicon, which metal increases the solubility of carbon in the molten bath.

Beta silicon carbide crystals have been found to have highly desirable properties which are important for semiconductor devices, electroluminescent devices, and the like. Such devices are capable of operating at temperatures up to 500° C. or 600° C. or even higher and are resistant to nuclear radiation damage. When such crystals are grown with extreme purity, i.e. of less than 2 parts per million (p.p.m.) of impurities, the desirable physical properties are greatly enhanced.

It has been proposed as disclosed in the U.S. patent to Shockley, No. 3,053,635, to provide a molten metal or alloy solvent having in solution therewith carbon and silicon. Such solvent may be iron, copper, nickel, aluminum, aluminum-zinc alloy, bismuth, manganese, cobalt or tin. When such a molten metal bath is formed and a small localized region is cooled, silicon carbide may be crystallized on a seed crystal of silicon carbide. Silicon and carbon are continuously added to maintain the proper concentration of silicon carbide in solution during the growing of the crystal.

The Hergenrother U.S. Patent 2,996,456 proposes melting chromium or silicon or other silicon carbide solvent in a crucible and dissolving silicon carbide therein. A cooled seed of silicon carbide is introduced into the melt and gradually withdrawn from the melt as silicon carbide is crystallized thereon. The silicon carbide may be supplied from the wall of the crucible if a silicon carbide crucible be used, or silicon carbide may be introduced into the hotter part of the melt if an inert crucible be used.

However, the metals suggested in the prior art for use with silicon in molten baths are capable of forming compounds with silicon, or other constituents of the bath, or have been found to be otherwise unsuitable for use in growing single crystals of beta silicon carbide. Many of such metals are unsuitable for use in a bath with silicon at the temperatures found desirable for the growth of beta silicon carbide crystals. Also, some of these metals do not sufficiently increase the solubility of carbon over the amount soluble in molten silicon.

The metal to be used with silicon to form the bath must be capable of thorough miscibility with silicon and capable of greatly increasing the solubility of carbon in the bath over its solubility in pure silicon. It must not be capable of reacting with silicon or carbon or with the silicon carbide crystal being grown. The bath itself must be molten at temperatures between 1400° and 1800° to form a saturated solution of silicon-carbon so that a continuous transfer of silicon-carbon can be made to the surface of a growing crystal. Also, the metal added to silicon to form the molten bath should have a lower melting point than that of silicon so that such metal will not be evaporated or volatilized at the temperature desirable for outgassing the charge under a high vacuum.

It has been found in accordance with this invention that a bath of pure silicon and silver meets the requirements for forming a suitable bath to dissolve carbon and for the growth of the beta silicon carbide crystals without the formation of extraneous silicides, solid solutions or compounds to interfere with the growth of a single pure crystal of beta silicon carbide.

An object of the invention is to grow a crystal of beta silicon carbide of hyperpurity from a molten bath of silicon and silver which bath has the property of dissolving a substantial amount of carbon at temperatures between 1400° and 1800°.

Another object of the invention is to provide a molten bath of silicon and silver containing carbon in solution from which a single crystal of beta silicon carbide can be grown at a temperature of between about 1450° C. to about 1800° C. by a continuous transfer of supersaturated silicon-carbon to the surface of a crystal being grown.

Another object of the invention is to provide a rotatable crucible arrangement for the molten bath which has at least an inner surface which is inactive to or highly resistant to molten silicon.

A still further object of the invention is to provide suitable apparatus for the growing of a single crystal of beta silicon carbide of high purity from a molten bath of silicon and silver containing carbon in solution.

According to the invention a molten bath containing substantial amounts of both silicon and silver is formed from ingredients of high purity and carbon is dissolved in this bath. Upon introduction of a suitable seed crystal and a suitable lowering of the temperature of the upper portion of the bath, supersaturated silicon-carbon will deposit in crystalline form on the seed crystal gradually forming a single crystal of beta silicon carbide. Since silicon carbide does not exist as a liquid at any pressures contemplated by the process of the present invention, the silicon and carbon in solution for growing the crystal are referred to herein as "silicon-carbon," or "Si-C."

An important feature of the invention which enables one to grow single beta silicon carbide crystals to a substantial size without spontaneous nucleation of a multiplicity of small crystals is the removal of the heat of crystal formation as the crystal of silicon carbide is grown, so that the temperature of the growing crystal is approximately that of the supersaturated portion of the melt from which the crystal is being grown.

These and other objects, features, and advantages will be apparent from the appended diagrammatic drawings in which:

FIGURE 1 is an elevational view, partly in section, of a modified Czochralski furnace in which, in accordance with this invention, crystal growing is carried out;

FIGURE 2 is an elevation partly in section and to a larger scale to show the seed crystal in detail as well as to reveal a gas manifold in position to cool the seed; and FIGURE 3 is the top view of the manifold of FIGURE 2, shown partly in section in conjunction with the seed crystal.

Referring to FIGURE 1, the furnace 1 is a modified Czochralski furnace in which the high density carbon crucible 2 rests on a supporting table 3 which is a part of the vertical rod 4 extending through the bottom of the furnace and through the seal 5. The rod 4 may be moved vertically upwardly and downwardly and may also be rotated in either direction. The seal 5 is preferably a Wilson seal, and this seal as well as the other Wilson seals to be referred to is of the type having alternating layers of Teflon and brass so that a rod passing through the seal may be moved longitudinally in either direction or may be rotated on its axis without leakage of gas either into or out of the furnace. This is important inasmuch as the furnace is operated with the interior at a high vacuum or under one or more atmospheres of pressure as will appear hereinafter.

The coil 6 is a heating coil which may be of the radio-frequency type or the electrical resistance type, and it is preferably liquid cooled. The furnace 1, preferably constructed of stainless steel, is also supplied with a liquid cooled jacket 7 having a suitable inlet 9 and outlet 8. Through another Wilson seal 10 a liquid cooled seed holder or seed rod 11 projects into the furnace and such rod may be moved vertically upwardly and downwardly and also rotated in either direction. This rod 11 has a projecting member 12 into which a carbon chuck 13 may be secured. This chuck is best shown in FIGURE 2, and is provided for the purpose of firmly holding a seed crystal 14. In the crucible 2 a molten bath 15 is indicated from which the beta silicon carbide crystal in accordance with this invention is grown.

An important feature of the invention is the provision for suitable cooling of the crystal to remove the heat of crystal formation as the crystal is being grown. This might be by use of a heat conductive chuck of suitable material or by other means. It has been found that a particularly advantageous cooling means is the provision of a device 16 for supplying a suitable inert gas for cooling the crystal directly above the molten bath.

The device 16 comprises a vertical tube portion 17 passing through a Wilson seal 18 and an inclined tube portion 17a terminating at its lower end in a hollow annular manifold 19. This hollow annular manifold surrounds the seed crystal and is provided with a number of small openings or apertures 20 to project small jets of the inactive gas radially toward the crystal. These openings 20 are arranged at an angle to the horizontal as seen in FIGURE 2 so that they tend to project the gas upwardly away from the molten bath as well as radially toward the crystal being grown for a purpose to be more fully explained hereinafter. Preferably, the manifold and the tube through which the cooling gas is carried to the crystal are made of a highly refractory metal such as molybdenum, for example. A suitable viewing port 21 having the usual quartz window (not shown) is provided so that the growing of the crystal can be observed.

In the preparation of the molten bath for carrying out the invention to grow beta silicon carbide crystals of hyperpurity, a charge is formed of hyperpure silicon and silver. The silver has a purity of 99.9999% plus and neither the silver nor silicon has any impurity detectable by the usual analytical spectrographic techniques. Similarly the high density carbon used in the charge is of hyperpurity and contains no impurity detectable by such spectrographic techniques.

The crucible 2 for holding the charge should be of a high degree of purity so as not to contaminate the molten bath. Also, it should be highly resistant to the molten bath which contains a large percent of highly reactive silicon. One of the best materials for the crucible is a high density, hyperpure carbon and preferably this is provided with a coating at least on its inner surface which renders it more impervious and resistant to the bath. A coating that is particularly desirable is one of beta silicon carbide chemically bonded and tightly adherent to the crucible. Such a crucible may be made by the method forming the subject matter of my copending application Ser. No. 378,421, filed June 26, 1964.

Before receiving the charge of silver, silicon and carbon, the crucible is outgassed for many hours in a high vacuum and at a temperature of about 1800° C. In forming the charge of silver and silicon it is desired to use at least about 50% silicon by weight. A suitable charge comprises about 15 to 50% silver and about 85 to 50% silicon. A preferred proportion is about 18 to 35 or 40% silver and the balance silicon. Such a proportion readily dissolves sufficient carbon to carry out the process. If silver is present in the charge in too large a proportion it is likely to be volatilized during the outgassing operation at 800–900° C. or so and when under a high vacuum. Such volatilization may be avoided by using less than 50% silver and this is true even during the high temperatures attained during stabilization of the melt as referred to hereinafter. The silver and silicon are preferably in granular or finely divided form.

A small percent of carbon, that is, from about 0.2%–1% of the combined silver and silicon is also included in the charge either before or after the silicon and silver are first melted. Preferably the carbon is added when making the charge, either in finely divided form or as a solid piece or pieces. A rod or ring is sometimes used. An excess of the carbon over that which dissolves in the silicon and silver melt is desirable to take care of depletion of the carbon as the crystal is grown. Such excess will be present when upwards of .5% carbon is included in the charge of silicon and silver.

In carrying out the process the crucible with its charge is placed in a modified Czochralski type of furnace and is outgassed for several hours at a temperature of the order of 850° C., that is a temperature between about 800°–900° C., while the furnace is maintained at a pressure of less than $2 \times 10^{-5}$ mm. of mercury and preferably less than $2 \times 10^{-6}$ mm. of mercury.

After the outgassing is completed the crucible and the components of the charge have less than 2 p.p.m. of impurities. An inert gas, such as argon, krypton or helium from which the nitrogen has been removed is introduced into the furnace until a positive pressure of about 1 atmosphere or more is attained. Preferably pure helium gas is used as this is most readily available but it is to be understood in references hereafter to helium that other inert gases not containing nitrogen may be used. This blanket of helium under positive pressure tends to prevent evaporation of the silver and/or silicon during the crystal growing operation. Pressure of 2 to 4 atmospheres of helium may be used but a pressure of the order of about 3 atmospheres has been found to be quite satisfactory and therefore preferred.

The temperature of the furnace is then raised to approximately 1800° C. for several hours in order to stabilize the melt and permit the solution of a substantial quantity of carbon therein. After such stabilization the crucible or heating element is moved relatively with respect to the other so that a temperature gradient is established. The top of the melt should have a temperature about 50° C. to 100° C. lower than the bottom. Preferably the top is about 1640° C. and the bottom about 1740° C. While it is possible to grow the beta silicon carbide crystals at temperatures from about 1450° C. to about 1800° C. it has been found that better results are obtained if the temperature of the top of the melt is maintained between about 1600° C. and 1700° C. and the bottom of the crucible at a temperature of about 100° C. higher.

A water cooled seed rod having a suitable clamp or chuck 13 of pure high density carbon at its lower end is provided with a small seed crystal 14, which is securely fastened in the chuck. The seed rod is preferably raised or lowered and rotated by two independent, shock mounted variable speed motors (not shown).

While the seed crystal preferably is silicon carbide, seed crystals can be used that can exist at the high temperatures necessary and which have crystallographic parameters sufficiently similar to silicon carbide so that beta silicon carbide will grow thereon. Both alpha and beta silicon carbide crystals can be used but it is preferable to use a seed crystal of beta silicon carbide.

A suitable size of seed for growing the beta silicon carbide crystal is one of about 1 mm. x 1 mm. and 2 to 3 mms. in length. The seed is preferably secured in the carbon chuck before the furnace is heated and evacuated. During the heating of the furnace the seed rod and seed are preferably lowered until the seed is close to, but above the melt as shown in FIGURE 1 so that the seed will attain substantially the same temperature as the melt before introduction of the lower part of the seed into the top of the melt.

After establishing the temperature gradient for the crucible and melt, the seed is lowered to the position shown in FIGURE 2 so as to introduce its bottom portion into the cooler upper portion of the melt which contains Si-C in a supersaturated condition. Relative motion between the seed end and the upper portion of the melt is caused by rotation of the seed rod and/or the crucible containing the melt. Preferably the seed rod and seed are rotated about the axis of the seed rod in one direction at about 25 r.p.m. and the crucible is rotated in the opposite direction at about 50 r.p.m. Such relative motion between the seed and the supersaturated portion of the molten bath facilitates the growth of the crystal on the seed.

When equilibrium is reached after the seed rod and the crucible are set in motion relative to each other, the seed pulling mechanism is set in operation to pull the seed upwardly from the top of the bath during the growth of the crystal. The pulling rate may vary from about 0.1 to 0.6 mm. or more per hour. An initial pulling rate of about 0.2 mm. or 0.3 mm. is usually satisfactory and this may be increased to about 0.5 to 0.6 mm. per hour as the crystal growth proceeds.

A very important feature of the invention is the provision of a suitable mechanism for removing the heat of crystal formation as the crystal grows. The beta silicon carbide crystal has poor thermal conductivity and if the heat of crystal formation is not removed as such heat is evolved, nucleation is likely to start at the surface of the bath so that one or more additional crystals may start to form on the single crystal being grown.

The particular manner of removing the heat of crystal formation may be accomplished in any way that is suitable and effective. An advantageous way is by providing a hollow annular manifold 19 above the surface of the molten bath, the manifold having a series of openings, preferably small apertures 20 disposed radially inwardly, so that small jets of relatively cool helium gas may be directed radially toward the growing crystal above the surface of the bath. Preferably the apertures are so formed in the inner face of the manifold so that the small jets of cool inert gas will be directed slightly upwardly from the surface of the bath as well as radially toward the crystal. The apertures in the manifold preferably have a diameter of ¼ mm. or less. Such an array of small jets of cool helium gas removes the heat from the crystal without disturbing the temperature equilibrium existing at the interface of the bath and the crystal. Thus it is possible to grow a single crystal of beta Si-C to a length of 10 to 12 mms., but for most purposes of application a length of 7 to 8 mms. is usually desired.

Suitable pressure regulating valves are preferably provided in conjunction with a flow meter to regulate the pressure and amount of flow of the inert gas into and out of the system so that the pressure in the interior of the furnace may be maintained at the desired pressure level.

The cross sectional area of the crystal grown depends somewhat on the rate of pulling of the crystal from the molten bath. If the rate is too slow the growing crystal will tend to bulge or thicken and if the rate is too fast the crystal will tend to thin or decrease in cross sectional size. If it be desired to have the crystal of substantially uniform cross sections the pulling rate should be adjusted as the crystal grows. For most purposes the crystal is desired to be about 1 to 3 mm. on a side and 7 to 8 mms. long.

Seed crystals of beta silicon carbide may be obtained in various ways. One method is by crystallizing numerous small crystals from a melt of pure silicon in a high density, pure carbon crucible having no inner protective lining. The molten silicon is held for a number of hours at about 1800° C., then a temperature gradient is established so that the upper surface portion of the melt is hotter than the bottom portion and the melt is cooled slowly at the rate of 25° C. per hour to room temperature. The silicon may be removed chemically from the crucible thus exposing small seed crystals of beta silicon carbide which grew in the bottom portion of the crucible.

If it is desired to modify the characteristics of the beta silicon carbide crystal being grown, conventional methods of doping may be employed. Nitrogen and phosphorus atoms, for example, may be provided in desired amounts in the helium atmosphere to act as donors, and boron and aluminum atoms may be provided to act as acceptors. Atoms of other metals, usually those of the third or fifth group of the periodic table, may be used, if desired, for modification of a crystal being grown.

A specific example of the process of growing a hyperpure beta silicon carbide crystal follows:

A charge was formed of 10 gms. of silver of a purity of 99.9999% plus, 30 gms. of hyperpure silicon and 0.4 gm. of powdered high density carbon of extreme purity. The charge was thoroughly mixed and placed in a crucible of high density carbon having a coating of beta silicon carbide chemically and tightly adherent to the inner walls and bottom of the crucible. A seed crystal of beta silicon carbide of a size of about 1 mm.$^2$ and 2 mm. in length, was secured in the carbon chuck at the lower end of the water-cooled seed rod.

The crucible and charge were placed in a modified furnace of the Czochralski type and the furnace was evacuated to a pressure of $2 \times 10^{-6}$ mm. of mercury. The furnace was heated to 850° C. and the crucible rotated for several hours during the outgassing of the crucible and charge. After the outgassing was completed pure helium gas from which the nitrogen had been removed was introduced into the furnace until a pressure of approximately 50 p.s.i. was obtained.

The seed rod was then lowered so that the seed was close to the surface of the molten charge and the temperature of the furnace was then raised to about 1800° C. and the molten charge allowed to set for 8 to 10 hours to dissolve carbon and stabilize the charge. The temperature of the crucible was then adjusted by movement of the crucible vertically in the heating coil so that at the top portion of the crucible the temperature of the bath was 1640° C. and at the bottom portion it was 1740° C.

The seed crystal at this time had approximately the same temperature as the molten bath and the seed rod was lowered so that the lower portion of the seed engaged the top of the melt. The seed rod was set in rotation at 25 r.p.m. and the crucible set in rotation in the opposite direction at 50 r.p.m. When an equbrium conditon was reached, the seed pulling mechanism was put in operation so that the seed was raised at 0.3 mm. per hour, thus to enable a continuous buildup of the growing crystal surface. The helium pressure was adjusted to 50 p.s.i. and helium to cool the crystal above the molten bath was introduced through the small apertures in the annular manifold, so that small jets of helium were projected radially towards the crystal and also slightly upwardly toward the crystal above the surface of the liquid bath. The helium pressure in the furnace was kept substantially constant during the growth of the crystal by the provision of suitable flow valves to permit escape of helium gas as the helium pressure tends to exceed the predetermined maximum.

In about thirty hours a crystal of hyperpure beta silicon carbide of a cross sectional size of about 1 mm. x 1 mm. and about 8 mms. long was grown. The crystal was pulled up above the melt and the furnace and crystal allowed to cool slowly (about 8 to 10 hours or so) until the furnace reached room temperature. The crystal was then removed from the chuck and etched in a suitable fused salt bath at a temperature of approximately 800° C.–1000° C. to remove any adherent silicon and to etch the surface of the crystal.

The crystal was pale yellow in color and transparent to visible light. Spector-chemical analysis showed no impurities present and its high purity was also indicated by resistivity measurements of high magnitude (200 to 300 ohms-cm.). The hardness was 9.5 Moh's scale.

The example given above illustrates my novel process of growing hyperpure crystals of beta silicon carbide. The process however may be used advantageously in the growing of beta silicon carbide crystals of high purity but of less than the extreme purity frequently desired, and such crystals have many useful applications where such extreme purity is unnecessary.

As will be apparent to those skilled in the art, the description of my novel method of growing single crystals of beta silicon carbide of high purity is not to be limited to use with specific apparatus, or the manipulative operations shown or described, but is subject to numerous modifications without departing from the invention as defined in the appended claims.

What is claimed is:

1. The process of growing a crystal of beta silicon carbide which comprises forming a charge of silver, silicon and carbon of high purity in a crucible having an inner surface resistant to molten silicon, the charge containing 60% to 85% silicon, 15% to 40% silver, and carbon in the amount 0.2% to 1% of the silicon combined and silver, outgassing the crucible and charge in a furnace under high vacuum at a temperature of the order of 800° to 900° C., introducing an inert gas into the furnace to a pressure of more than 1 atmosphere, melting the charge and establishing a temperature gradient in the molten bath in the crucible, so that the top of the melt is more than 50° C. cooler than the bottom of the melt and the temperature at the top of the melt is between 1450° C. and 1800° C., introducing a seed crystal into the top of the melt by means of a seed holder, causing relative rotating movement between the holder with its seed and the crucible containing the melt, causing the seed to be pulled gradually upwardly from the melt, removing the heat of crystal formation as it is produced, continuing the growing process until the seed has attained a length of several millimeters, and permitting the crucible, melt and crystal to cool slowly.

2. The process according to claim 1 in which the seed crystal is silicon carbide.

3. The process according to claim 1 in which the heat of crystal formation is removed by small jets of an inert gas projected above the melt and radially toward the crystal being grown.

4. The process according to claim 1 in which the seed holder and seed are introduced into the furnace with the seed slightly above the melt in the crucible, prior to establishing the temperature gradient in the melt, whereby the seed is preheated to substantially the temperature of the melt before introduction into the top portion of the melt.

5. The process according to claim 1 in which the components of the charge are of hyperpurity and the inert gas is free of nitrogen.

6. A crystal of beta silicon carbide prepared by the process of claim 1 and being of a pale yellow color, transparent, having a hardness of 9.5 Moh's scale, and containing no impurities detectable by standard spectrographic analytical techniques.

References Cited

UNITED STATES PATENTS

| | | | |
|---|---|---|---|
| 2,872,299 | 2/1959 | Celmer et al. | 23—301 |
| 2,889,240 | 6/1959 | Rosi | 148—1.6 |
| 3,053,635 | 9/1962 | Shockley | 23—208 |
| 3,124,489 | 3/1964 | Vogel et al. | 148—1.6 |
| 3,144,308 | 8/1964 | Tarter | 148—1.6 X |
| 3,174,827 | 3/1965 | Wakelyn et al. | 23—208 |
| 3,228,753 | 1/1966 | Larsen | 148—1.6 X |

OTHER REFERENCES

Chipman et al.: "Activity of Silicon in Liquid Fe-Si and Fe-C-Si Alloys," Acta Metallurgica, vol. 2 (May 1954), pp. 439–450, pp. 442 and 443 relied on.

OSCAR R. VERTIZ, *Primary Examiner.*

MILTON WEISSMAN, *Examiner.*

G. T. OZAKI, *Assistant Examiner.*